US008844005B2

(12) United States Patent
Jakobsson et al.

(10) Patent No.: US 8,844,005 B2
(45) Date of Patent: Sep. 23, 2014

(54) AUTHENTICATION BASED ON USER BEHAVIOR

(75) Inventors: Bjorn Markus Jakobsson, Mountain View, CA (US); Jessica N. Staddon, Redwood City, CA (US); Philippe J. P. Golle, San Francisco, CA (US); Richard Chow, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1069 days.

(21) Appl. No.: 12/270,208

(22) Filed: Nov. 13, 2008

(65) Prior Publication Data
US 2010/0122329 A1 May 13, 2010

(51) Int. Cl.
*H04L 9/32* (2006.01)
*G06F 21/31* (2013.01)

(52) U.S. Cl.
CPC ..................................... *G06F 21/316* (2013.01)
USPC ............................................................. 726/6

(58) Field of Classification Search
CPC ....... G06F 21/316; G06F 21/00; G06F 21/30; G06F 21/31
USPC .............................................................. 726/6
See application file for complete search history.

(56) References Cited

U.S. PATENT DOCUMENTS

| 2005/0114679 | A1* | 5/2005 | Bagga et al. | 713/184 |
|---|---|---|---|---|
| 2007/0211678 | A1* | 9/2007 | Li et al. | 370/338 |
| 2007/0271601 | A1* | 11/2007 | Pomerantz | 726/5 |
| 2008/0066165 | A1* | 3/2008 | Rosenoer | 726/5 |
| 2010/0070334 | A1* | 3/2010 | Monteverde | 705/10 |

OTHER PUBLICATIONS

M.Jakobsson, L. Yang, and S. Wetzel. "Quantifying the Security of Preference-Based Authentication." DIM '08.
M.Jakobsson, E. Stolterman, S. Wetzel, and L. Yaang "Love and Authentication", In Proceedings of ACM Human/Computer Interaction Conf. (CHI), 2008.

\* cited by examiner

*Primary Examiner* — William Goodchild
(74) *Attorney, Agent, or Firm* — Shun Yao; Park, Vaughan, Fleming & Dowler LLP

(57) ABSTRACT

One embodiment of the present invention provides a system for authenticating a user. During operation, the system records user behavior history at one or more devices associated with the user. The system then extracts user information associated with a place and/or an activity from the recorded user behavior history. The system further generates one or more challenges based on the extracted user information, thereby facilitating the verification of the user's identity.

18 Claims, 3 Drawing Sheets

AUTHENTICATION BASED ON USER BEHAVIOR

BACKGROUND

1. Field of the Invention

The present disclosure relates to verification of user identity. More specifically, the present disclosure relates to verification of user identity based on recorded user behavior history.

2. Related Art

The increased popularity of the Internet has changed modern life significantly. Many conventional activities have been transferred to the Internet. Internet users use the Internet to conduct daily activities such as shopping, banking, and even social activities. For reasons of security and confidentiality, when using a web service, a user is often required by the website to set up a password-protected user account. A user is authenticated by the web server using his password each time he accesses his account.

However, such a password-based authentication is either not sufficiently secure or cumbersome to users. A user's password can be obtained by malicious intruders, who can easily impersonate the user using the hacked password. On the other hand, a user may want to select a long and complicated password to reduce the likelihood of it being hacked. However, a long and complicated password becomes difficult for the user to remember, especially in the case when a user holds a number of accounts each having a unique password.

Once in a while a user may forget the password for his account and will need the website to reset the password. Before the website resets a user's password, the website verifies the identity of the user. In order to facilitate user identity verification, when setting up an account, a user is often required to manually input answers to a set of simple questions, sometimes referred to as security questions or challenges. For example, the user may need to input his mother's maiden name, the name of his childhood pet, or the name of the high school he attended. Such information is then stored in the user's profile. When the user requests password resetting, the website will ask him the same set of questions. By comparing the user's instant answer with information stored in his profile, the website can determine if the user requesting the password resetting is indeed the original user who set up the account.

Such an approach has several drawbacks. First, the answers to many questions might be easily guessable. For example, due to limited numbers of popular names for pets, an intruder may correctly guess the name of the first pet of the legitimate user. Second, the answers to some questions might be hard to remember, such as the name of the user's first teacher. In addition, answers to many common questions, such as high school attended, might be available to intruders by searching the user's public record. Examples of public records include the user's résumé posted online, or, the user's profile in an online social network. Therefore, asking simple short questions during user registration is not sufficiently secure for user identity verification.

To overcome the limitations of asking simple short questions, one approach is to present a user with an extended list of personality-related, yes-and-no questions, including his preference for certain items, such as certain kinds of food or a particular type of sport (see M. Jakobsson, L. Yang, and S. Wetzel. "*Quantifying the Security of Preference-based Authentication*" DIM'08.) Answers to these questions are easy to remember for a user but difficult to guess for an intruder. In general, the longer the list, the more difficult it is for an intruder to impersonate the user. Similar to inputting his mother's maiden name, a user is required to manually input the answers to the long list of yes-and-no questions while setting up the account. Although he may select his answers by clicking the mouse, answering a long list of questions is still burdensome. Furthermore, the user's personal preferences may change over time.

What is needed is a method to facilitate verification of a user's identity during password resetting in a secured manner without requiring the user to manually input user information while setting up the account.

SUMMARY

One embodiment of the present invention provides a system for authenticating a user. During operation, the system records user behavior history at one or more devices associated with the user. The system then extracts user information associated with a place and/or an activity from the recorded user behavior history. The system further generates one or more challenges based on the extracted user information, thereby facilitating the verification of the user's identity.

In a variation on this embodiment, the system extracts user information without explicitly requiring the user to input the information manually.

In a variation on this embodiment, the system allows the user to select categories for the generated challenges.

In a variation on this embodiment, user information includes the user's past and/or current geographic locations.

In a variation on this embodiment, user information includes the user's web browsing history.

In a variation on this embodiment, recording user behavior history includes recording GPS traces.

In a variation on this embodiment, recording user behavior history includes recording Wi-Fi hotspots to which the device associated with the user has coupled.

In a variation on this embodiment, recording user behavior history includes detecting nearby devices corresponding to a party associated with the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method to allow a secure system to collect user-behavior-related information through computer devices associated with the user, and then use the collected information to organize a set of questions to ask the user in order to verify the user's identity. Because the system automatically obtains answers to the set of questions, a user is not required to input any user-related information beforehand.

Collecting User Information

Figure 1:
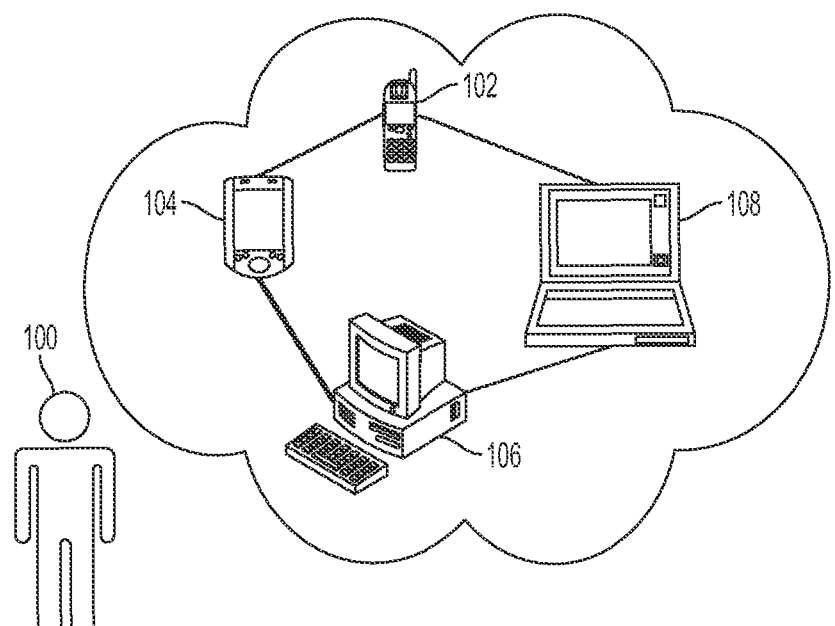
FIG. 1 illustrates a user and his associated computer devices in accordance with one embodiment of the present invention.

FIG. 1 illustrates a user 100 and his associated computer devices including a mobile phone 102, a personal digital assistant (PDA) 104, a desktop computer 106, and a laptop computer 108. In one embodiment, mobile phone 102 can be a smart phone.

User 100's daily activity can be tracked through his associated computer devices. One aspect of user 100's daily activity is his geographical location, such as places he lives or visits. In one embodiment, user 100's geographic location is tracked through his mobile phone 102 which communicates with a wireless service provider's network. Based on the sub-network which communicates with mobile phone 102, a secure system, e.g., a password-protected web service, that is to ask the user security questions can extract user 100's information regarding his geographic location. For example, the system can find out whether user 100 has been to Las Vegas recently by determining whether his mobile phone 102 has communicated with the wireless service provider's sub-network in Las Vegas.

Figure 2:
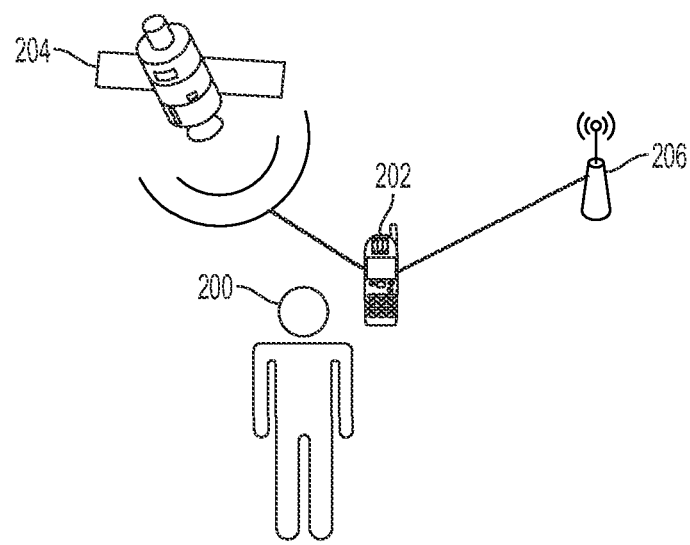
FIG. 2 illustrates a user's mobile phone communicating with a satellite and a Wi-Fi hotspot in accordance with one embodiment of the present invention.

To obtain precise user location information, in one embodiment, a user mobile phone or PDA includes a Global Positioning System (GPS) device. As shown in FIG. 2, a user 200's smart phone 202 receives signals from a satellite 204 to obtain its GPS position. The system can then extract the GPS trace from smart phone 202 to obtain detailed location information related to user 200. For example, from the GPS trace, the system can identify the place user 200 has been visiting, such as a restaurant or a museum.

In addition to GPS positioning, the system can also obtain user 200's location based on the Wi-Fi hotspots associated with user 200's smart phone or laptop computer. Also shown in FIG. 2, user 200's smart phone 202 couples to the Internet through a public Wi-Fi hotspot 206. By extracting information related to Wi-Fi hotspot 206 from smart phone 202, the system can identify the public place, such as an airport or a train station, visited by the user.

Another aspect of user activities may include a user's web-browsing behavior. By communicating with a user's laptop computer or desktop computer, the system that is to ask the user security questions can extract information related to the web-browsing behavior of the user. For example, the system can identify the user's most frequently or recently visited web pages.

Figure 3:
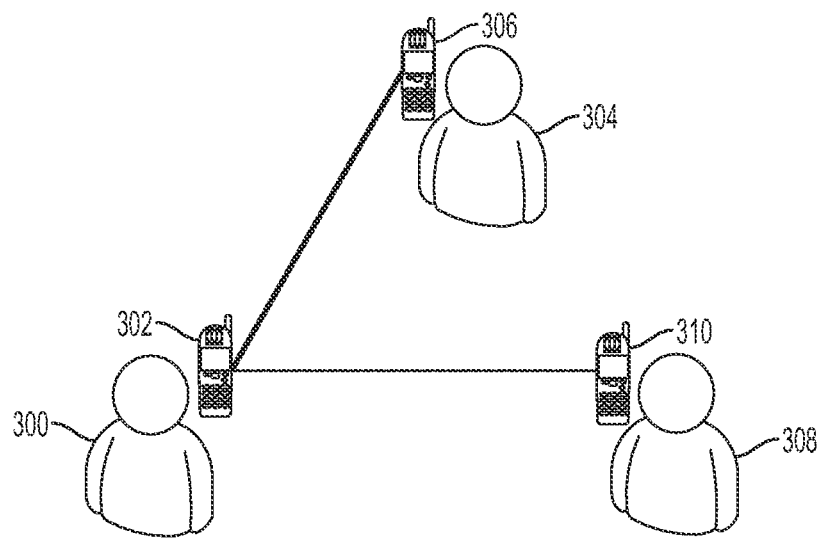
FIG. 3 illustrates a user's mobile phone detecting other nearby mobile phones in accordance with one embodiment of the present invention.

The system can also track a user's activity not only from computer devices carried by the user but also from other computer devices near the user. FIG. 3 illustrates a user in the vicinity of his friends in accordance with one embodiment of the present invention. In FIG. 3, a user 300 carries a mobile phone 302 which detects nearby mobile phones 306 and 310 belonging to user 300's friends 304 and 308, respectively. By extracting information related to other computer devices nearby, the system can determine whether user 300 is accompanied by one or more of his friends or family members, and subsequently generate security questions based on these friends and family members.

User Identity Verification

In one embodiment, the system constantly collects and stores user-behavior-related information, which can be used for user identity verification during password resetting. In order to save storage space, the system can save only information regarding a user's behavior within a period of time, or only information regarding a user's behavior that is outside of the user's routine. In one embodiment, the system saves information regarding a user's behavior within the most recent month. In another embodiment, the system saves a user's geographic location each time he leaves his home region.

Once a user requests password resetting, the system uses stored user behavior information to generate a set of questions (or challenges). In one embodiment, the system generates questions regarding places visited by the user during a certain time period. Such questions can be open ended or yes-and-no questions. For example, for a user who has visited New York in the past month, the system may ask a question like "What is the major city you recently visited?" or "Did you visit New York last month?"

In a further embodiment, the system may combine user location information with information about the user's companion to ask a more specific question such as, "Did you visit New York last month with Joe?" A GPS trace may provide a more precise user location. For example, the system may ask the name of the restaurant visited by the user on the day he requests password resetting. Note that the tracking of Wi-Fi hotspots to which the user's devices have coupled to can also provide a more precise location of the user. Other types of questions may refer to the most recently visited website and a calendar or note entry on the user's PDA.

By tracking a user's daily activity, the system can collect a large amount of user-behavior-related information. Using such information, the system can generate a long list of questions which can only be correctly answered by the legitimate user, thus providing enhanced security. Note that a user is not required to input answers to those questions beforehand. Furthermore, because the questions are generated at the time of password resetting based on the user's recent behavior, a user can easily remember answers to the questions.

In one embodiment, a user can decide what category of questions to be generated based on his behavior. For example, a user can request the system to generate questions based on his travel history or his web-browsing history. In this way, a user can select questions that have relatively easy to remember answers.

Figure 4:
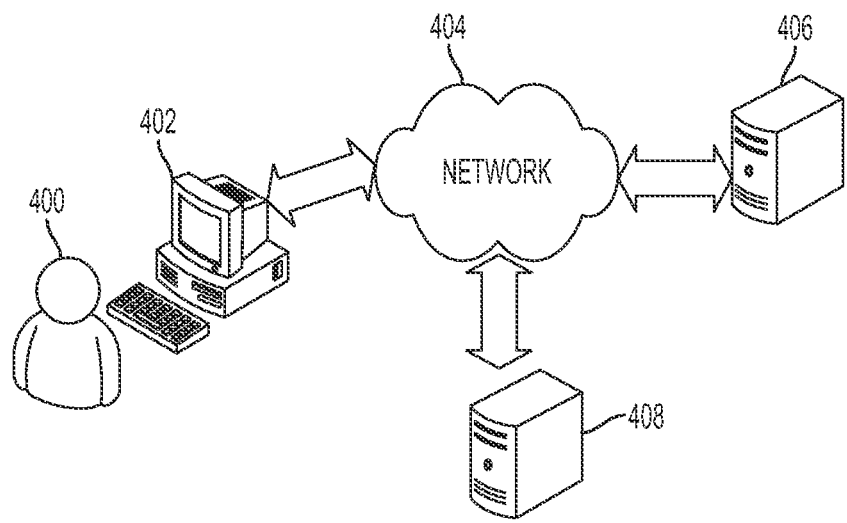
FIG. 4 illustrates the networking environment for user identity verification in accordance with one embodiment of the present invention.

FIG. 4 illustrates the networking environment for user identity verification in accordance with one embodiment of the present invention. In FIG. 4, a user 400 accesses a website using his desktop computer 402, which communicates with a web server 406 over a network 404. Not shown in the figure are user 400's other associated computer devices, such as mobile phones, PDAs, etc., which are also coupled to network 404. A centralized user-identity-verification server 408 couples to network 404 and collects behavior information for user 400 from his associated computer devices.

In one embodiment, behavior information for user 400 is stored on user-identity-verification server 408. When user 400 requests a password reset at web server 406, web server 406 forwards the request to user-identity-verification server 408, which then gathers behavior information for user 400 and generates a set of questions (challenges) based on the behavior information. User-identity-verification server 408 sends the set of generated questions along with their answers to web server 406, which then posts the questions for user 400 to answer. Web server 406 compares the answers inputted by user 400 with the answers sent by user-identity-verification server 408 to determine if user 400 is the legitimate user.

In another embodiment, user-identity-verification server 408 periodically sends user behavior information to web server 406. Therefore, when user 400 requests to reset his password, web server 406 generates a list of questions and answers for user 400 based on the user behavior information stored on web server 406. In a further embodiment, instead of relying on a centralized server to collect and store user behavior information, web server 406 collects behavior information of user 400 from his associated computer devices.

Figure 5:
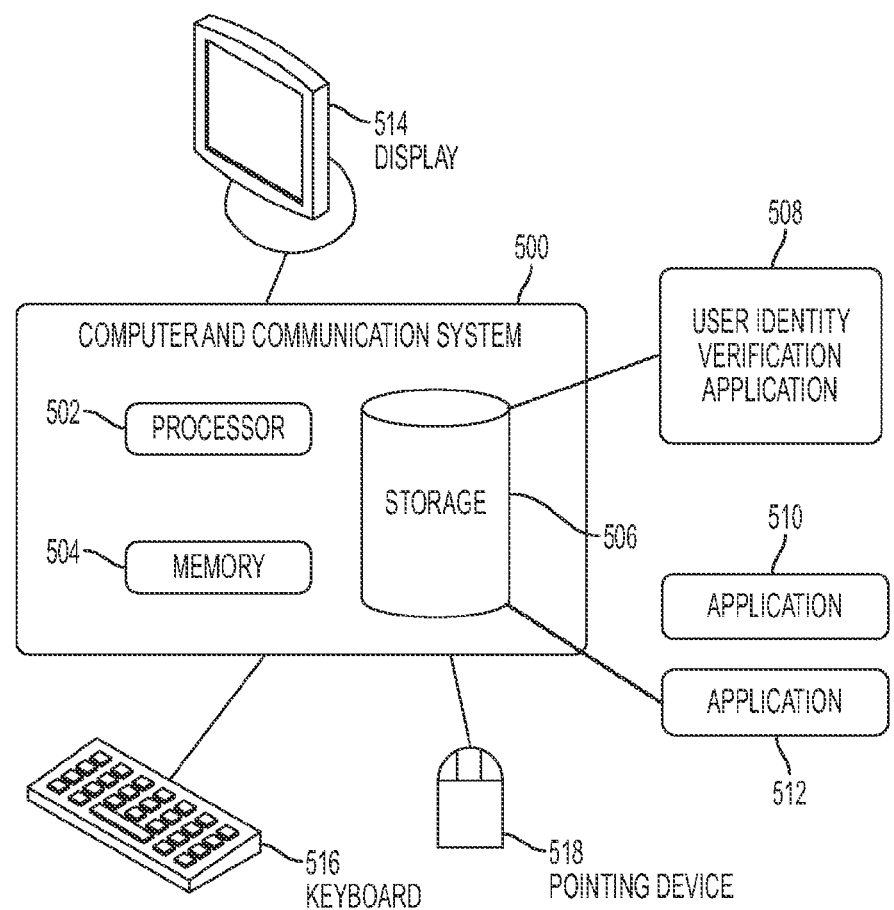
FIG. 5 illustrates an exemplary computer system for user identity verification in accordance with one embodiment of the present invention.

FIG. 5 illustrates an exemplary computer system for user identity verification in accordance with one embodiment of the present invention. In one embodiment, a computer and communication system 500 includes a processor 502, a memory 504, and a storage device 506. Storage device 506 stores a user-identity-verification application 508, as well as other applications, such as applications 510 and 512. In one embodiment, user-identity-verification application 508 further includes a program that facilitates the collecting of user behavior information and the generation of security questions. During operation, user-identity-verification application 508 is loaded from storage device 506 into memory 504 and then executed by processor 502. While executing the program, processor 502 performs the aforementioned functions. Computer and communication system 500 is coupled to an optional display 514, keyboard 516, and pointing device 518. Display 514, keyboard 516, and pointing device 518 can facilitate user identity verification.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for authenticating a user of an account associated with an online service, the method comprising:
   receiving, by a server computer, a request to reset a password for the user's online account;
   obtaining a user behavior history from one or more computing devices associated with the user, wherein the user behavior history includes activities performed by the user outside of the user's online account;
   extracting user information associated with the activities performed by the user outside of the user's online account from the obtained user behavior history; and
   generating one or more challenges based on the user information obtained from data sources outside of the user's online account, wherein generating the one or more challenges involve generating a challenge based on one or more of: a GPS (Global Positioning System) trace associated with the one or more computing devices, a computing device in a physical vicinity of the one or more computing devices, and a web-browsing history identifying webpages viewed by the user on the one or more computing devices, and wherein the one or more challenges facilitate verification of the user's identity for the online account.

2. The method of claim 1, wherein the user information is extracted without explicitly requiring the user to input the user information manually.

3. The method of claim 1, further comprising allowing the user to select categories for the generated challenges.

4. The method of claim 1, wherein generating the one or more challenges involves generating a challenge based on the user's location during a pre-determinate time period.

5. The method of claim 1, wherein generating the one or more challenges involves generating a challenge based on Wi-Fi hotspots to which the one or more computing devices associated with the user have coupled.

6. The method of claim 1, wherein generating the one or more challenges involves generating a challenge based on a calendar entry from the one or more computing devices associated with the user.

7. A non-transitory computer-readable storage medium storing instructions which when executed by a computer cause the computer to perform a method for authenticating a user of an account associated with an online service, the method comprising:
   receiving a request to reset a password for the user's online account;
   obtaining user behavior history from one or more computing devices associated with the user, wherein the user behavior history includes activities performed by the user outside of the user's online account;
   extracting user information associated with the activities performed by the user outside of the user's online account from the obtained user behavior history; and
   generating one or more challenges based on the user information obtained from data sources outside of the user's online account, wherein generating the one or more challenges involve generating a challenge based on one or more of: a GPS (Global Positioning System) trace associated with the one or more computing devices, a computing device in a physical vicinity of the one or more devices, and a web-browsing history identifying webpages viewed by the user on the one or more computing devices, and wherein the one or more challenges facilitate verification of the user's identity for the user's online account.

8. The computer-readable storage medium of claim 7, wherein the user information is extracted without explicitly requiring the user to input the user information manually.

9. The computer-readable storage medium of claim 7, wherein the method further comprises allowing the user to select categories for the generated challenges.

10. The computer-readable storage medium of claim 7, wherein generating the one or more challenges involves generating a challenge based on the user's location during a pre-determined time period.

11. The computer-readable storage medium of claim 7, wherein generating the one or more challenges involves generating a challenge based on Wi-Fi hotspots to which the one or more computing device associated with the user have coupled.

12. The computer-readable storage medium of claim 7, wherein generating the one or more challenges involves generating a challenge based on a calendar entry from the one or more computing devices associated with the user.

13. A computer system for authenticating a user of an account associated with an online service, comprising:
- a processor;
- a memory;
- a request-receiving subsystem configured to receive a request to reset a password for the user's online account;
- a subsystem configured to obtain user behavior history from one or more computing devices associated with the user, wherein the user behavior history includes activities performed by the user outside of the user's online account;
- an extraction subsystem configured to extract user information associated with the activities performed by the user outside of the user's online account from the obtained user behavior history; and
- a challenge generation subsystem configured to generate one or more challenges based on the extracted user information obtained from data sources outside of the user's online account, wherein while generating the challenges, the challenge generation subsystem is configured to generate a challenge based on one or more of: a GPS (Global Positioning System) trace associated with the one or more computing devices, a computing device in a physical vicinity of the one or more devices, and a web-browsing history identifying webpages viewed by the user on the one or more computing devices, and wherein the one or more challenges facilitate verification of the user's identity.

14. The computer system of claim 13, wherein the user information is extracted without explicitly requiring the user to input the user information manually.

15. The computer system of claim 13, further comprising a user selection subsystem configured to allow the user to select categories for the generated challenges.

16. The computer system of claim 13, wherein while generating the one or more challenges, the challenge generation subsystem is configured to generate a challenge based on the user's location during a pre-determined time period.

17. The computer system of claim 13, wherein while generating the one or more challenges, the challenge generation subsystem is configured to generate a challenge based on Wi-Fi hotspots to which the one or more computing device associated with the user have coupled.

18. The computer system of claim 13, wherein while generating the one or more challenges, the challenge generation subsystem is configured to generate a challenge based on a calendar entry from the one or more computing devices associated with the user.

* * * * *